Jan. 19, 1965  R. T. BURNETT  3,166,160
TWO-PIECE ADJUSTING SCREW FOR BRAKES
Original Filed Oct. 16, 1961
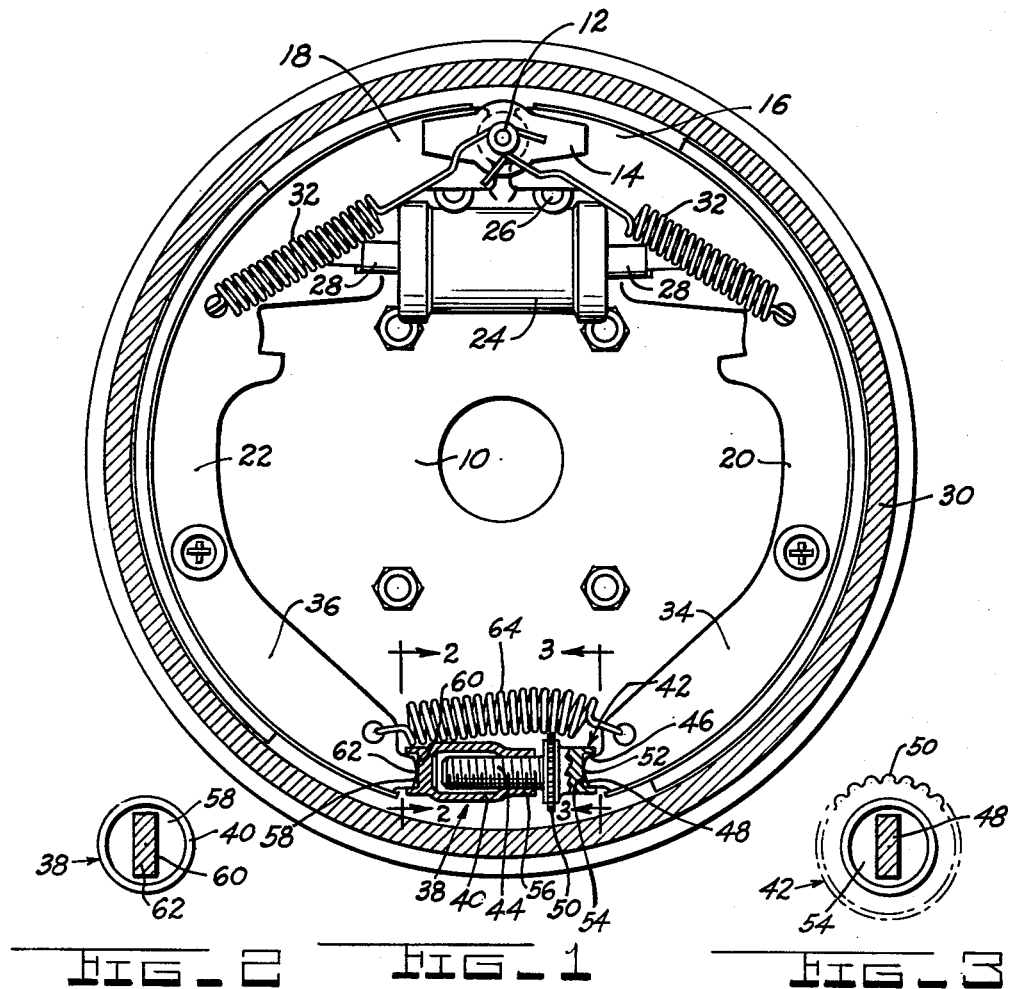
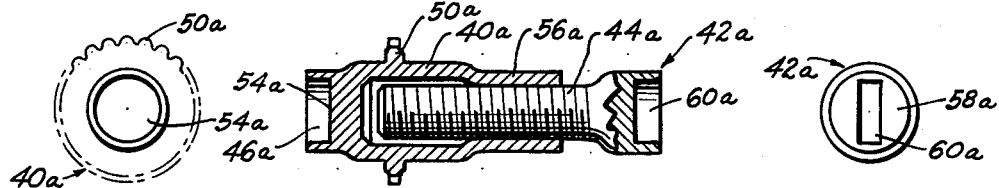
*INVENTOR.*
RICHARD T. BURNETT.
BY
*Sheldon F. Raper*
ATTORNEY.

United States Patent Office 3,166,160
Patented Jan. 19, 1965

3,166,160
TWO-PIECE ADJUSTING SCREW FOR BRAKES
Richard T. Burnett, South Bend, Ind., assignor to The Bendix Corporation, South Bend, Ind., a corporation of Delaware
Continuation of application Ser. No. 145,115, Oct. 16, 1961. This application Apr. 12, 1963, Ser. No. 272,772
3 Claims. (Cl. 188—79.5)

This application is a continuation in whole of U.S. application Serial No. 145,115 filed on October 16, 1961, now abandoned.

This invention relates to a brake adjusting mechanism.

More particularly the invention concerns an adjusting mechanism of the type which is used as a strut between the brake shoes.

The brake adjusting mechanism most commonly employed on brakes of today's vehicle is a three-piece adjusting mechanism consisting of a socket, adjusting screw and adjusting screw nut. Generally, the adjusting screw nut and the socket are joined with their respective shoe webs in a nonrotatable connection. The adjusting screw is interconnected between the socket and the adjusting nut and rotates relative to the adjusting nut and the socket.

It is an object of the present invention to provide an adjusting mechanism having fewer parts and less expensive to build than adjusting mechanisms now employed in the brake art.

It is an additional object of the invention to provide a two piece adjusting mechanism interposed between the shoe ends of a brake comprising a first member nonrotatably secured to one of the shoes and a second member interconnected with said first member and rotatably secured to the other shoe.

The above and other objects and features of the invention will appear more fully hereinafter from a consideration of the following description, taken in connection with the accompanying drawings wherein an embodiment of the invention is illustrated by way of example.

In the drawings:

FIGURE 1 is a plan view of the brake assembly;

FIGURES 2 and 3 are section views taken on the line 2—2 and 3—3 respectively of FIGURE 1;

FIGURE 4 is a view of a modification of the two-piece mechanism;

FIGURE 5 is an end view of the adjusting screw nut of the modification of FIGURE 4; and FIGURE 6 is an end view of the adjusting screw of the modification of the adjusting mechanism of FIGURE 4.

With reference to FIGURE 1, the brake with which the device of the invention is associated comprises a backing plate 10 mounted on an appropriate part of a vehicle such, for example, as the axle flange, not shown. Positioned on the backing plate is a fixed anchor pin 12 provided with a guide member 14 extending parallel to the backing plate for sliding engagement with webs 16 and 18 of shoes 20 and 22 so as to retain the adjacent shoe ends in a laterally fixed location with respect to backing plate 10. The shoe ends 16 and 18 are spread apart by a fluid motor 24 secured to the backing plate 10 by any suitable means, such as fastening members 26. The fluid motor includes a pair of oppositely-acting pistons, not shown, operatively connected to the shoe ends 16 and 18 through force transmitting links 28. Actuation of the piston applies a force to each of the links tending to move the shoes toward a rotatable drum 30 which may be secured to a wheel, not shown. Springs 32 have one end connected to the anchor 12 and the other end connected to the respective shoes to urge them into contact with the anchor when the fluid motor is not pressurized.

The shoe ends 34, 36 oppositely disposed from the anchor 12 are interconnected by an adjusting mechanism 38. The adjusting mechanism comprises an adjusting screw 42 and an adjusting screw nut 40 which are relatively rotatable. The adjusting screw 42 is provided with a threaded stem 44 and a round opening 46 into which a projection 48 of shoe end 34 extends. The adjusting screw 42 is further equipped with a serrated portion 50 for rotating said screw when an adjustment is required. The serrations are either engaged by a tool which is inserted through an opening in the backing plate (not shown) for manual adjustment, or are engaged by a lever of a well known automatic adjuster such as illustrated in the patent to Dombeck et al., U.S. Patent No. 2,938,610. The end of the projection 52 bears on closed end 54 of the opening 46 providing a bearing surface on which the adjusting screw 42 is rotated. One end of the adjusting screw nut 40 is provided with a threaded tubular portion 56, to receive the stem 44 of adjusting screw 42. The other end of the adjusting screw nut 40 is formed with a rectangularly shaped slot 60 to receive projection 62 of shoe end 36 of similar shape but dimensionally smaller so as to fit into said opening and bear on the closed end 58 of the slot. It should be noted that the ends of the projections 52 and 62 are rounded and the closed ends 54 and 58 of the opening 46 and the slot 60, respectively, are flat thereby providing relative rocking motion between the brake shoes and the adjusting strut during brake application. Spring 64 acts to maintain projection end 52 bearing on surface 54 and projection 62 within its associated slot 60.

It should be understood that either of the adjusting screw or adjusting screw nut may be fixed against rotation about its axis just so long as the other is free to rotate. FIGURE 4 illustrates an adjusting mechanism wherein the adjusting screw 42a has a slot 60a on one end and a threaded stem 44a on the other end. The adjusting screw nut is equipped with a serrated wheel 50a, a round opening 46a on one end and a tubular portion 56a threaded to receive threaded stem 44a on the other end. The adjusting screw nut 40a will have relative rotation with respect to the projection that is received within the round opening 46a and bears on closed end 54a and the adjusting screw will be secured against rotation relative to the projection received within its slot 60a.

It should be noted that the illustrated embodiment is most desirous since the construction of rounded end projections at one end of each shoe and the flat closed ends of the slot and opening of the adjusting strut enables construction of identical shoes, if desired, and allows relative rocking between both shoes and the strut during brake application.

It is to be understood that one of the prime purposes of the invention has been to accomplish economy in the number of components of the brake adjusting mechanism and also reduce the cost thereof. It is apparent that I have achieved these objects by eliminating the socket member for the adjusting screw.

Although this invention has been illustrated and described in connection with specific embodiments, numerous other adaptations of the invention will be apparent to those skilled in the art. I intend to include within the scope of the following claims all equivalent applications of the invention whereby the same or substantially the same results may be obtained.

I claim:

1. A brake assembly comprising: a support, T-shaped brake shoes slidably mounted on said support, means for moving said brake shoes in response to actuating signals, each brake shoe having a flat web with a flat projection formed integrally therewith at one end thereof, said shoes being disposed so the ends of said projections of the adjacent brake shoes will be opposed to each other, a two-piece adjusting device located between the opposed projections and comprising a first member with a threaded stem at one end and a second member having a threaded bore at one end receiving said threaded stem, one of said members having a hollow cylindrical flange at its other end defining a recess therein for receiving one of said projections, the other of said members having a hollow flange at its other end defining a slot therein for receiving the other of said projections, whereby said one member is rotatable relative to its respective shoe and said other member is prevented from rotating by its respective brake shoe, the ends of said projections engaging a respective bottom surface of said recess and said slot, each of said bottom surfaces being substantially flat and each of said projection ends being rounded to provided relative rocking movement between the ends of said projections and their respective surfaces during brake application, and means for maintaining said projections within their respective slot and recess.

2. The structure as recited in claim 1 wherein said recess is located on the other end of said first member and a serrated wheel is integral with said first member for rotating the same.

3. The structure as recited in claim 1 wherein said recess is located on the other end of said second member and a serrated wheel is integral with said second member for rotating the same.

References Cited in the file of this patent
UNITED STATES PATENTS

| | | |
|---|---|---|
| Re. 20,001 | McConkey | June 9, 1936 |
| 2,516,995 | House | Aug. 1, 1950 |